Sept. 13, 1966   W. M. FLOOK, JR., ET AL   3,272,945
THERMOSTATIC SWITCH EMPLOYING A MATCHING SET
OF TEMPERATURE RESPONSIVE MAGNETIC ELEMENTS
Filed July 29, 1963                                       2 Sheets-Sheet 1
FIG. I
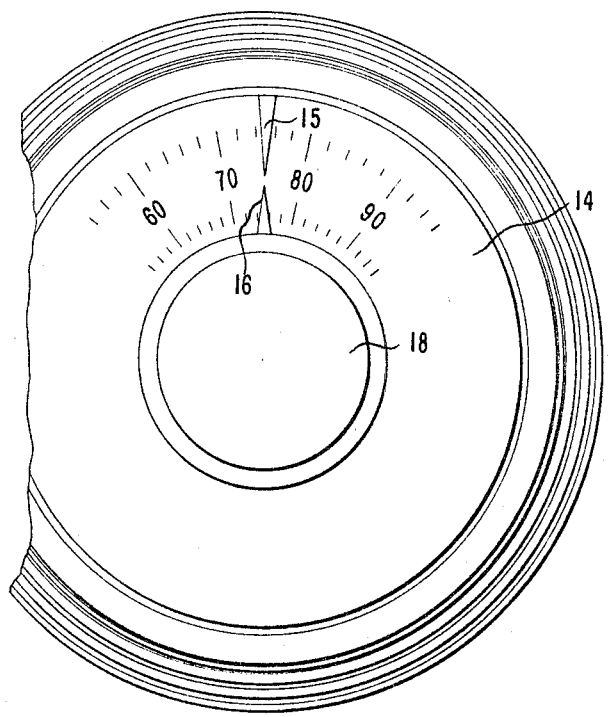
FIG. II
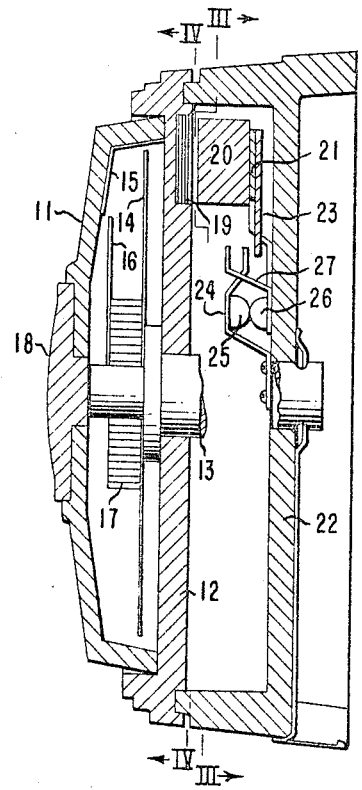
FIG. III
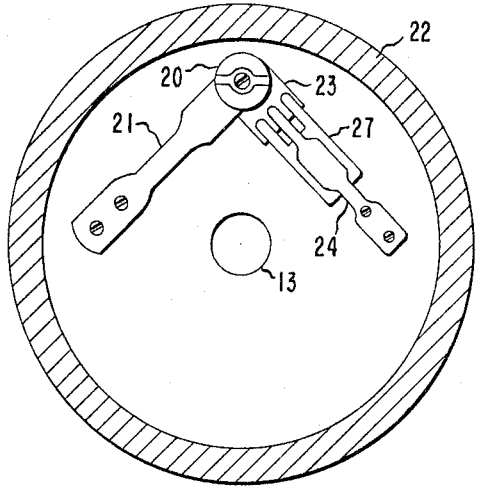
FIG. IV
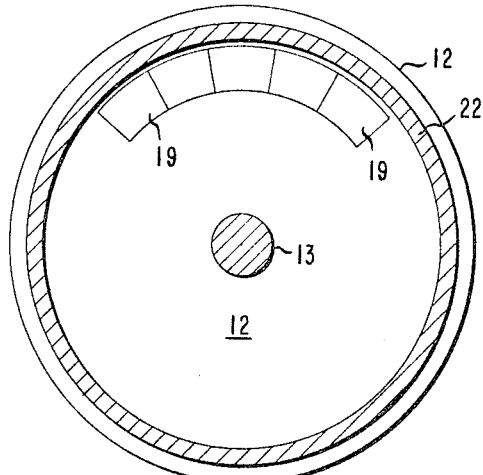
INVENTORS
WILLIAM M. FLOOK, JR.
PAUL A. VANCE, JR.
BY *Gary V. Samuels*
ATTORNEY

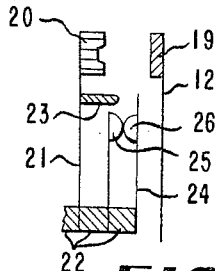
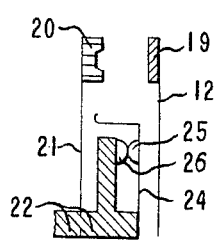
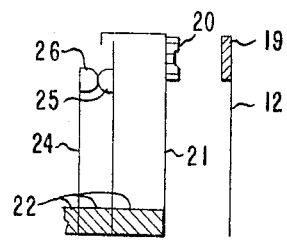
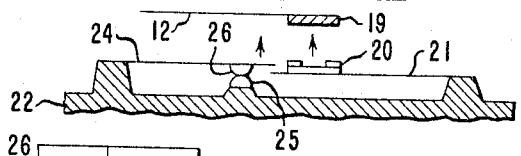
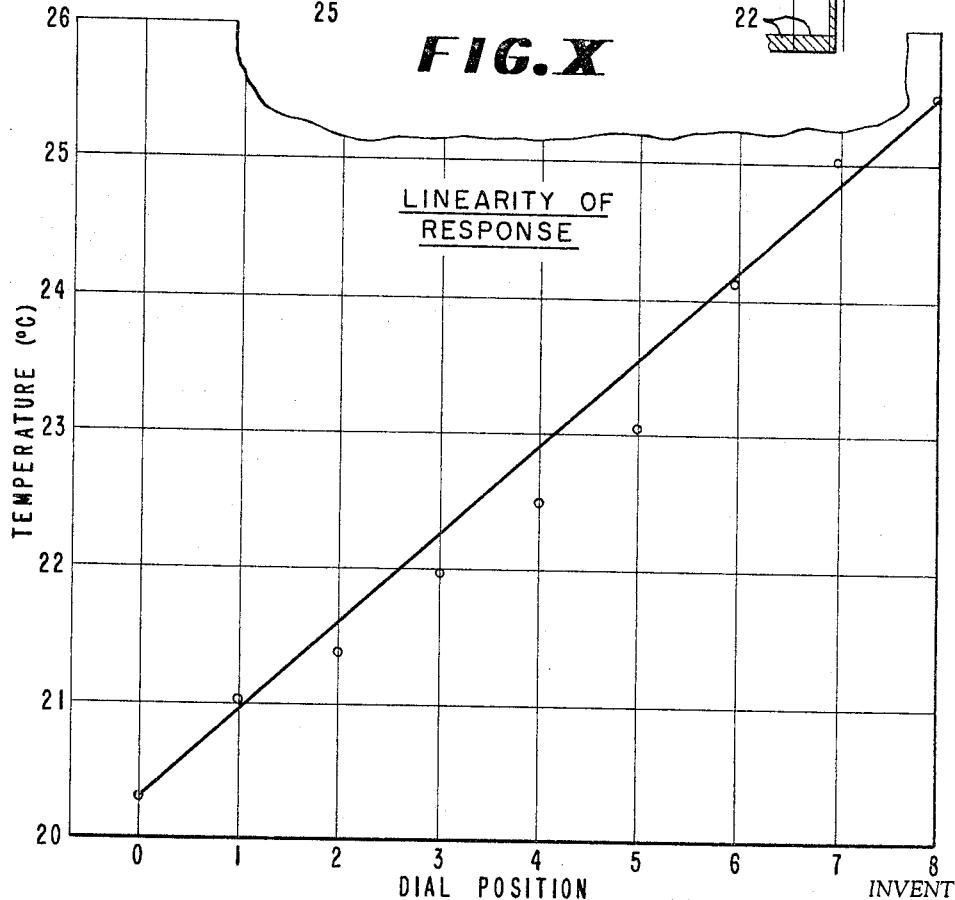

United States Patent Office 3,272,945
Patented Sept. 13, 1966

---

3,272,945
THERMOSTATIC SWITCH EMPLOYING A MATCHING SET OF TEMPERATURE RESPONSIVE MAGNETIC ELEMENTS
William M. Flook, Jr., Wilmington, and Paul A. Vance, Jr., Newark, Del., assignors to E. I. du Pont de Nemours and Company, Wilmington, Del., a corporation of Delaware
Filed July 29, 1963, Ser. No. 298,299
8 Claims. (Cl. 200—138)

This invention relates to temperature control devices and is particularly concerned with an adjustable temperature control device for controlling the temperature of an environment by controlling the current to a heating or cooling unit for heating or cooling the environment.

Such adjustable temperature control devices for thermostats are employed in diverse fields of modern technology, e.g. to control the circulation of cooling medium in internal combustion engines, to regulate the temperature of water in boilers and hot-water storage systems, and to control the temperature of living quarters, assembly halls, and the like. In most of these devices a bimetallic element is conventionally employed as a temperature responsive component which effects the opening or closing of contacts to the heating or cooling unit by deflection of the bimetallic element. In these devices a small permanent magnet is sometimes incorporated to stabilize operation, for in the absence of such a magnet, the slow deflection of the bimetallic element causes arcing as the contacts close. The magnet is used to cause rapid opening or closing of the contacts during the last stages of deflection. Thus the operation of the bimetallic temperature responsive component is not dependent upon the presence of a magnet.

It is an object of the present invention to provide an adjustable temperature responsive control device in which magnetic elements are employed as the temperature responsive component. Another object of the present invention is to provide an adjustable temperature control device in which the temperature response depends upon temperature sensitive magnetic elements. Another object of this invention is the provision of such a device which is capable of easy adjustment and uniformity in the temperature differential produced by an adjustment of given magnitude regardless of the temperature at which the device is set to operate. Still another object of the present invention is the provision of such a device which readily leads itself to miniaturization. These and other objects will become apparent from the following discussion.

Generally, the device of the present invention is a control device for controlling the temperature of an environment by controlling the current to a heat transfer plant i.e., heating or cooling unit, which comprises a matched set of temperature responsive magnetic elements (i.e., a series of elements each of which exhibits a reversible increase in saturation induction at a different discrete transition temperature level, and which are arranged, or matched, in a sequential order of graduated transition temperature levels) mounted on a movable member which also contains temperature setting indicator means for obtaining or selecting a desired temperature of the environment; magnetic means mounted on resilient means and positioned to respond to a selected matched element when said element is in a magnetized state, thereby forcing the resilient means from rest position; and switch means for actuating a heat transfer plant, the switch means actuated and deactuated by motion of the resilient means away from and toward the desired matched element.

The materials employed as magnetic elements in the control devices of this invention are possessed of the characteristic of undergoing a sharp and reversible increase in saturation induction with change in temperature in the course of a first-order solid-phase-to-solid-phase transition with maintenance of crystal symmetry. In a typical element, the change from non-magnetic to magnetic state and vice versa, takes place over a total temperature interval of about 2–10° C. and is a linear function of the temperature over approximately the central 80% of this temperature range. For convenience, the midpoint of the range is usually referred to as the temperature at which the change between magnetic and non-magnetic states occurs. However, the temperature at which a permanent magnet will attract the element will not necessarily coincide with this midpoint temperature but will depend, among other things, on the distance between the magnet and element and on the force required to initiate motion of the magnet and/or element.

By selecting magnetic elements each having a different transition temperature level, and arranging them in order of progressing transition temperatures, a gradient is obtained in which transition of the elements from non-magnetic to a magnetic state occurs at successively higher temperatures, and vice versa. By further arranging the magnetic elements so that the one with the desired transition temperature can be moved into the magnetic field of the permanent magnet, the basis for the operation of the device of the invention is obtained. However, such an arrangement suffers from the disadvantage that the number of temperatures at which control can be achieved is not substantially greater than the number of elements employed unless certain additional features are incorporated. These features include positioning and constructing magnetic elements such that adjacent elements can be brought into very close proximity and selecting the proper temperature-magnetization relationship for adjacent elements as described more fully below. A set of elements incorporating these features is termed a matched set herein. By careful adjustment of these features, it is possible to provide a substantially linear response utilizing a set of elements having relatively widely spaced transition midpoints. Such a matched set of elements is one of the features of this invention.

To achieve response at temperatures intermediate to the transition temperatures of the individual elements, it is necessary that the transition ranges of adjacent elements overlap to at least some extent and that the elements be positioned so close to one another that the total element surface area facing the magnet remains approximately the same regardless of whether the magnet is adjacent to a single element or is adjacent to portions of two elements. This is accomplished by providing elements of a shape which permits opposite edges of each element to come into close proximity for substantially the entire edge length to the adjacent edges of neighboring elements. For example, if the elements are mounted peripherally on a circular support, adjacent edges of the elements should correspond to radii of the support, and the elements preferably correspond in shape to annular segments. When the elements are arranged in a linear fashion, then a rectangular or square shape for each element is most convenient. Again, if the elements are arranged on the surface of a cylinder, edges of each element adjacent to neighboring elements should be parallel to the cylinder axis. In all cases, it is preferred that the edges of adjacent elements be in contact or very nearly in contact throughout substantially the entire edge length.

Although, with such an arrangement of elements, intermediate set points can be achieved, it is necessary for linear response that a further criterion be met, viz., that the transition range for each element be approximately twice the temperature interval between transition midpoints for adjacent elements. Stated in another way, if the interval between midpoints for adjacent elements be designated by $\Delta T$, then the linear portion of the transition range for each individual element should be approximately $2\Delta T$.

Linearity of response is also affected by the relationship between the size of the magnet and the size of an individual element. Size here refers to the cross-section of the magnet (or element) facing the element (or magnet), i.e., perpendicular to a line joining the midpoints of magnet and element. If the element is much larger than the magnet, flat spots in the temperature response of the device will result. Because of this and for economic reasons, it is desirable that the magnet and element be of approximately the same size in at least one dimension.

The invention will be best understood from the following description of specific embodiments when read in connection with the accompanying drawings, in which:

FIG. I is a front view of a temperature control device according to the present invention;

FIG. II is a cross-section of FIG. I;

FIG. III is a sectional view taken along line III—III of FIG. II;

FIG. IV is a sectional view taken along line IV—IV of FIG. II;

FIGS. V–VIII are each partially schematic views corresponding to FIG. II but illustrating a modified embodiment of the invention;

FIG. IX illustrates still another embodiment particularly applicable for controlling a cooling unit;

FIG. X illustrates the linearity of response of a thermostat of this invention.

Referring now to a preferred embodiment disclosed in FIGS. I–IV of the drawing, the device comprises a rotatable control 11 rigidly attached to a circular disk 12 which is centered on a shaft 13 for rotation around said shaft. The rotatable control 11 contains a transparent material for viewing dial 14. Dial 14 has a temperature scale indicating a temperature range. A first pointer 15 is attached to the rotatable control 11 for selection of a desired temperature, while a second pointer 16, attached to a bimetallic thermometer 17, indicates the actual temperature of the environment whose temperature is to be controlled and regulated. The thermometer 17 is hidden from view by circular plate 18.

The circular disk 12 carries the matched set of temperature responsive magnetic elements 19 which are positioned so that as circular disk 12 rotates upon movement of rotatable control 11, any desired one of the elements 19 can be brought into the magnetic field of permanent magnet 20. The magnet 20 is positioned on a resilient or spring biased lever 21 which is, in turn, attached to a circular base 22. Base 22 is rigidly attached to shaft 13.

When the desired magnetic element 19 becomes magnetized, permanent magnet 20 is attracted toward the element 19, thus forcing spring biased lever 21 from its rest position. Spring biased lever 21 carries an insulated plate 23 which moves with spring biased lever 21 as said lever is forced from its rest position by the magnetic attraction. Insulated plate 23 is positioned to contact spring loaded lever 24 and force it from its rest position. Spring loaded lever 24 carries an electrical contact 25, which, when said spring loaded lever 24 is in rest position, makes contact with electrical contact 26 located on base 22. Each contact 25 and 26 is attachable to a circuit connected with a heating unit for heating the environment. A stop 27 serves to limit motion of the spring biased member 21.

In operation, rotatable control 11 is turned until pointer 15 indicates the desired temperature. This brings the magnetic element 19 whose transition temperature corresponds to the desired temperature into the magnetic field of magnet 20. When the temperature of the environment reaches the transition temperature, element 19 becomes magnetized, attracting magnet 20. The movement of magnet 20 toward the element 19 also carries the free end of spring biased lever 21 and insulated plate 23 toward the element 19. During this motion insulated plate 23 contacts the free end of spring loaded lever 24 thus breaking electrical contacts 25 and 26, which in turn cause the breaking of an electrical circuit, whereby the heating unit is shut down. Stop 27 prevents the magnet 20 from contacting element 19.

Upon cooling of the temperature of the environment to a point below the transition temperature of element 19, element 19 returns to a demagnetized state causing spring biased lever 21 to return to rest position, which, in turn, allows spring loaded lever 24 to return to its rest position. This allows electrical contacts 25 and 26 to close, completing the circuit to the heating unit, thereby causing the heating unit to start up.

Although it would appear simplest and therefore most desirable to have one contact 25 or 26 of the electrical switch mounted on spring biased member 21 itself, this arrangement is unsatisfactory in practice because the force holding the two contacts of the switch together diminishes slowly as the magnet 20 is more and more attracted to the temperature responsive element 19. This difficulty is avoided according to the present invention by mounting both switch contacts separately from the lever arm so that contact is maintained under uniform pressure until the magnet is strongly attracted to the temperature responsive element, whereupon contact is abruptly broken.

If desired, a conventional heat anticipatory coil may be employed to raise the temperature of the medium inside the thermostat slightly above that of the surrounding environment.

FIGS. V–VIII illustrate other suitable embodiments of the invention. In said figures the operation of the device is essentially the same as that of the device discussed above.

In the device of FIG. V, the movement of magnet 20 toward element 19 causes the insulated plate 23 to force spring loaded lever 24 from its rest position, thereby breaking contacts 25 and 26.

In FIG. VI, the movement of magnet 20 forces spring biased lever 21 against the projection on spring loaded lever 24 thereby breaking contacts 25 and 26.

In FIGS. VII and VIII, the movement of magnet 20 causes the projection on spring biased lever 21 to catch spring loaded lever 24 thereby breaking contacts 25 and 26.

FIG. IX illustrates an embodiment suitable for controlling a cooling unit. Here the movement of magnet 20 toward element 19 causes spring biased lever 21, which carries contact 25 to move from rest position to a point where contacts 25 and 26 close; thus causing the circuit to a cooling unit to close.

In the embodiment illustrated, the magnetic elements are generally uniform in size and shape and have adjacent edges in close proximity to one another for substantially the entire edge length. The magnet is preferably substantially the same size in at least one dimension as one of said uniform elements.

A thermostat constructed according to the design shown in FIGS. I–IV used chromium modified manganese antimonide as the material for the temperature responsive elements. Each element was generally of keystone shape and was 0.13″ wide at the narrow end with a taper of 9° to the wide end, 0.31″ long and 30 mils in thickness. When assembled side by side, 10 of these elements produced a 100° arc having a mean radius of ⅞″. These elements had transitions at temperatures indicated in Table I.

TABLE I.—TRANSITION TEMPERATURES OF MATCHED SET OF TEMPERATURE RESPONSIVE ELEMENTS

| Element No. | Transition Temperature (° C.) | |
|---|---|---|
| | Midpoint | Range (10%–90%) |
| 1 | 13.1 | 10.5–16.6 |
| 2 | 15.9 | 14.0–18.3 |
| 3 | 18.3 | 15.7–21.1 |
| 4 | 21.6 | 19.3–27.3 |
| 5 | 23.0 | 20.0–26.5 |
| 6 | 26.6 | 23.8–29.6 |
| 7 | 28.1 | 25.5–30.6 |
| 8 | 31.3 | 28.6–35.1 |
| 9 | 33.8 | 31.5–36.4 |
| 10 | 36.2 | 32.9–40.7 |

The elements were applied in the order indicated in Table I to a nylon disk which served as circular disk 12. The disk was about 2″ in diameter and ⅛″ in thickness, and had a knob of the same material attached thereto.

A magnet 20 of the composition 13.5% Ni, 24% Co, 8% Al, 3% Cu, and 51% Fe (by weight) was employed. The magnet was 0.31″ in diameter and 0.20″ in maximum thickness. It was mounted at one end of a beryllium-copper spring (8 mils in thickness) by means of a machine screw inserted into a tapped hole in plate 23, said plate being ¼″ square and 5/16″ thick. Contact 25 of gold-silver-platinum (69–25–6) alloy was attached to a spring of beryllium-copper measuring 0.008″ thick x 3/16″ wide. Contact 26 was of similar composition. Stop 27 was fabricated from 20 mil copper sheet.

Linearity of response for this thermostat was determined by measuring the operating temperature for a number of settings between a setting with the magnet directly over elements 3 and 4 of Table I (designated as dial position 0) and a setting over elements 5 and 6 (designated as dial position 8). Temperature of operation was measured by a thermocouple attached to the set of elements at a point midway between positions 0 and 8. The interval between these positions was divided into 8 equal parts to give positions 1 through 7. Temperatures at which the thermostat operated to close contacts 25 and 26 at each of the positions 0 to 8 are shown in the graph of FIG. X. From this graph it is apparent that satisfactory linearity was achieved, the maximum deviation being 0.5° C.

The operating characteristics of the thermostats of this invention are largely dependent on the force-distance relationship for magnet and temperature responsive element and on the characteristics of the spring biased member carrying the magnet and the spring lever carrying the contact(s). Of course, the spacial arrangement must be such that the contact points are separated or brought together abruptly to minimize arcing. In the thermostat described above, relatively small forces of 5–10 g. were required for operation and the requisite characteristics were obtained using 8 mil beryllium-copper stock for fabrication of springs. The desired strength was obtained by appropriate choice of specific width over a part of the length of the spring within the range of 70–80 mils.

The material employed for the contacts in the thermostats of this invention can be any of the usual contact materials. When relatively small forces are required for operation, it is desirable to use such contact materials as gold-silver-platinum (69–25–6), silver-palladium (50–50), and silver-gold (90–10). When stronger forces are available, i.e., forces in the range of 15–30 g. or more, various contact materials containing higher proportions of silver, can be used. Mercury tilt switches or other enclosed switches, so mounted that motion of the lever arm carrying the magnet actuates the switch, can be employed in place of the open contact type of switch depicted in the figures. In view of the relatively large motion of the magnet lever arm, such switches need not be as sensitive as the tilt switches used with bimetallic thermostats.

Any rigid material, preferably electrically insulating in character, can be employed for the base 22 and the circular disk 12. For ease in fabrication, the material is preferably one which can be molded to the desired shape and size with a minimum of finishing treatments required. Suitable materials are nylon, polymethyl methacrylate, polyacetal resins, phenol-formaldehyde resins and urea-formaldehyde resins.

For the magnet 20, any composition is suitable, which is permanently magnetic at the maximum temperature intended for use of the thermostat. Iron alloys, such as alloys containing aluminum (8–10%), cobalt (12.5–24%), copper (3–6%), nickel (13.5–17%), balance iron, are entirely suitable. Other suitable materials are well known in the art, see for example Bozorth, "Magnetic Materials" (D. Van Nostrand Co., Inc., New York, 1951), especially chapter 9. In addition to the aluminum-cobalt-iron-nickel alloys referred to earlier satisfactory results are obtained with magnet steels, such as the alloy containing 36% Co, 7% W, 3.5% Cr, 0.9% C, balance Fe; as well as aluminum-iron-nickel and cobalt-iron-vanadium alloys. Oxide compositions such as the ferrites, e.g., barium ferrite are also suitable, and useful magnets can be fabricated from acicular iron, iron-cobalt, or iron-nickel particles.

The magnets are formed by conventional melt casting or sintering techniques and may be heat-treated in known manner to develop desired properties. Magnets may also be formed by dispersing particles of the magnetic composition in a binder such as a polymer composition, e.g., a polyvinyl chloride composition, forming the dispersion to the desired shape and hardening by evaporation of solvent, if solvent be present, or by cooling if a heat-softened composition has been used.

The magnet usually is formed in the shape of a wafer or disk which may be grooved on one surface to form poles. The thickness of the magnet is not critical, provided there is sufficient magnetic material to afford a field of the desired strength. The dimensions of the broad faces of the disk or wafer should correspond approximately to the dimensions of the face of the temperature responsive element. However, it is not necessary that the magnet and element be identical in shape. For example, a magnet having a circular or rectangular face can be used with an element of generally wedge shaped configuration, and in such cases one dimension of the magnet face should be approximately equal to one dimension of the element, i.e., the diameter of a circular magnet face should correspond in length to the length or width at the center of a wedge-shaped element.

The substances employed as temperature responsive elements in the devices of this invention are possessed of the characteristic of abruptly changing in a controllable manner their saturation induction with changing temperature from a non-magnetic to a magnetic state in the course of the first-order transition from one solid state phase to a second solid state phase. This change in phase occurs with no change in crystal symmetry. It is preferred that this change be from an anti-ferromagnetic state on the one hand to a ferromagnetic or ferrimagnetic state on the other. This characteristic is in addition to normal Curie point or Néel point behavior of these substances.

A first-order transition, also known as a transition of the first kind, is one in which a discontinuity occurs in the first derivatives of the Gibbs free energy function. For example, there are discontinuities in the first derivative with respect to temperature, i.e., entropy, with respect to pressure, i.e., in volume, and for a magnetic material with respect to magnetic field, i.e., in magnetization.

A second-order transition is one in which the second derivative of the free energy function is discontinuous but the first derivative is continuous. In other words, at a second-order transition energy, volume, and in a magnetic substance magnetization change continuously but the temperature derivatives of these quantities have singularities. The Curie point in a magnetic material is an example of a second-order transition.

Further discussion of first- and second-order transitions is found in Swalin, "Thermodynamics of Solids," John Wiley & Sons, Inc., New York, 1962, pp. 72–73, and in "Phase Transformations in Solids" (Symposium at Cornell University, August 23–28, 1948), John Wiley & Sons, Inc., New York, 1951, chap. I, by L. Tisza, pp. 1 and 2. Quotations from these references are given below:

*Swalin.*—"If a transition occurs with a discontinuity in . . . first derivatives of the free energy, it is called a *first order transition.*"

"If . . . a transformation is discontinuous in its second derivatives of the free energy function, it would be identified as second order."

"The transformation from the ferromagnetic to the paramagnetic state is considered as an example of a second order transition."

*Tisza.*—"It is well known that there are two kinds of phase transitions: the first kind, called also of first order, in which energy, volume, and crystal structure change discontinuously; the second kind, frequently called . . . Curie points . . . , in which energy and volume change continuously, but the temperature derivatives of these quantities have singularities."

As defined in the "International Dictionary of Physics and Electronics," D. Van Nostrand, 2d ed., copyrighted in 1961, the Néel temperature is the transition temperature for an antiferromagnetic material, at which maximal values of magnetic susceptibility, specific heat, and thermal expansion coefficient occur.

Among compositions useful as temperature responsive elements of this invention are compositions as more fully described in copending U.S. patent application Serial No. 181,744, now Patent No. 3,126,347, filed March 22, 1962, by T. J. Swoboda, which contain at least two transition elements selected from Groups V–B, VI–B, and VII–B of the Periodic Table, of which at least one is taken from the first row of said transition elements, and at least one element of Group V–A selected from As, Sb and Bi, and which are further characterized by having a maximum saturation induction at a temperature above 0° K. but below the Curie point of the composition.

In these compositions, said Group V–A element(s) constitutes 5–40 atom percent of the whole and will generally be in the range of 5–35 atom percent. It will be understood that at least one Group V–A element of the group consisting of arsenic, antimony and bismuth, is always present in the compositions. Nitrogen and phosphorus may also be present. Of the remaining components, the transition metals of Groups V–B, VI–B and VII–B of the Periodic Table, i.e., at least two of V, Cr, Mn, Nb, Mo, Ta, W, and Re, of which at least one is selected from V, Cr and Mn, constitute from 35–95 atom percent, any other element present being a metal from Groups II–IV of the Periodic Table in an amount of not more than 30 atom percent. Suitable examples of such other elements are cadmium, gallium, indium, lead, thallium, tin, zirconium, scandium, yttrium, magnesium, and zinc. Ordinarily one of the transition metals enumerated above will constitute the major proportion of the transition metal content of the composition while the second transition metal will be present in minor proportion. However, in no case will the content of the second transition metal be less than 0.1 atom percent based on the total composition.

The Periodic Table referred to herein is the one appearing in Deming's "General Chemistry," John Wiley & Sons, Inc., 5th ed., chap. 11.

Compositions which are particularly useful as temperature-responsive elements contain antimony, manganese, and at least one additional transition metal, particularly chromium, vanadium, molybdenum or niobium, and optionally one or more additional elements selected from the group consisting of indium, cadmium, lead, zirconium, tin, gallium, thallium, scandium, yttrium, magnesium and zinc.

Examples of useful compositions are those containing antimony, 5–40 atom percent; manganese 35–91.9 atom percent; at least one element of the group chromium and vanadium, 0.1–38.5 atom percent; and optionally an element of the group cadmium, gallium, indium, lead, thallium, tin, zirconium, scandium, yttrium, magnesium and zinc, 0–30 atom percent, the percentage values being so chosen as to total 100%.

Other useful compositions contain antimony, 5–35 atom percent; manganese, 25–75 atom percent; at least one element of the group molybdenum and niobium, 0.1–50 atom percent; and optionally an element of the group cadmium, gallium, indium, lead, thallium, tin, zirconium, scandium, yttrium, magnesium and zinc, 0–30 atom percent.

The foregoing compositions can be described by the formula $Mn_aX_bZ_cSb_d$, where X is chromium, vanadium, molybdenum, or niobium; Z is indium, cadmium, gallium, lead, thallium, tin, zirconium, scandium, yttrium, magnesium or zinc; and $a$, $b$, $c$, and $d$ are the atomic proportions of the elements employed and are chosen so as to provide percentage compositions in the ranges stated above. Compositions, in which X and/or Z represent a combination of two or more elements, can also be employed in the devices of this invention.

Particularly useful compositions are those containing 53.5–91.9 atom percent manganese, 8–35 atom percent antimony, and 0.1–38.5 atom percent of an additional element of the group chromium, vanadium and mixtures thereof. These compositions can be described by the formula $Mn_aX_bSb_d$, where X is chromium and/or vanadium, and $a$, $b$ and $d$ are the above indicated atomic proportions of the elements, $a$, $b$ and $d$ totalling 1. Especially useful compositions have the formula

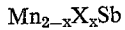

$$Mn_{2-x}X_xSb$$

where $x$ is 0.003–0.41, it being understood that the sum of the subscripts to Mn, X and Sb is 3.

Other useful compositions are those containing antimony, 5–35 atom percent; manganese, 35–70 atom percent; at least one element of the group chromium and vanadium, 0.8–25 atom percent; and an element of the group cadmium, gallium, indium, lead, thallium, tin, zirconium, scandium, yttrium, magnesium and zinc, 0–30 atom percent, the percentage values being so chosen as to total 100%.

Iron-rhodium alloys and iron-rhodium alloys containing up to 20 atom percent of at least one other element are also useful as temperature-responsive elements in this invention. Suitable alloys include those described by Fallot, Revue Scientifique 77, 498 (1939); Kouvel et al., General Electric Research Report No. 61–RL–2870M; copending U.S. applications Serial Nos. 177,229, now Patent No. 3,140,941, and 177,230, now Patent No. 3,140,942, filed March 5, 1962 by P. H. L. Walter; application Serial No. 192,060, now Patent No. 3,144,325, filed May 3, 1962 by P. H. L. Walter; and application Serial No. 192,059, now Patent No. 3,144,324, filed May 3, 1962 by T. A. Bither. These magnetic compositions consist essentially of iron and rhodium in major proportion and at least one other metal in minor amount. The third metal which also must always be present, will range in amount from 0.01–0.20 atom proportions. These new magnetic compositions are alloys of the formula $Fe_aRh_b[xM]_c$, where M represents (1) at least one A–Group element selected from the group beryllium, magnesium, aluminum, gallium, indium, silicon, germanium, tin, lead, phosphorus, arsenic, antimony, bismuth, sulfur, selenium, and tellurium, i.e., a member of Group II–A of the Periodic Table of the elements of atomic number 4–12, or a member of Groups III–A, IV–A, V–A, VI–A of the Periodic Table of the elements of atomic numbers 13 through 83, inclusive, and $x$ is an integer from 1–6 and generally 1–2; (2) at least one transition metal of atomic number 39–48 and 57–80, inclusive, other than rhodium, i.e., yttrium, zirconium, niobium, molybdenum, technetium, ruthenium, palladium, silver, cadmium, lanthanum, hafnium, tantalum, tungsten, rhenium, osmium, iridium, platinum, gold, and mercury, and $x$ is an integer from 1–6 and generally from 1–2; (3) at least one transition metal of atomic number 21–30, inclusive, other than iron, viz., scandium, titanium, vanadium, chromium, manganese, cobalt, nickel, copper, and zinc, and $x$ is an integer from 1–6 and generally 1–2; or (4) at least one rare earth metal of the lanthanum or lanthanide series of the Periodic Table of the elements of atomic numbers 58–71, inclusive, viz., cerium, praseodymium, neodymium, promethium, samarium, europium, gadolinium, terbium, dysprosium, holmium, erbium, thulium, ytterbium, and lutetium, and $x$ is an integer from 1–14, and generally 1–3. In all these iron-rhodium compositions, $a$ and $b$, which can be alike or different, are numbers ranging from 0.8–1.2, and $c$ is a number ranging from 0.01–0.20, and in the instance when $x$ is 2, the requisite $c$'s can be alike or different but still must fall in the indicated range. These subscript numbers refer to the atomic proportions of the elements in the final alloy. M can be different within the same defined group when $x$ is greater than 1.

Further compositions which can be employed as the temperature responsive component in devices of this invention contain manganese in an amount of at least 40 atom percent, a second metallic component selected from iron, cobalt, nickel, copper, and zinc, in an amount of 0.6–25 atom percent, and at least one of arsenic, antimony and bismuth in an amount of 25–40 atom percent. Additional components selected from the elements of Groups III–A, III–B, IV–A, IV–B, nitrogen and phosphorus in an amount of 0–25 atom percent may also be present. These compositions are described more fully in copending U.S. patent application Serial No. 66,194, filed October 31, 1960 in the name of T. J. Swoboda.

Still other compositions useful in the present invention are described in application Serial No. 66,195, now Patent No. 3,126,346, filed October 31, 1960 in the name of T. A. Bither. These compositions contain a single transition metal selected from vanadium, chromium, manganese, iron, cobalt, or nickel in an amount of 61–75 atom percent, and from 25–39 atom percent of at least two elements selected from gallium, germanium, selenium, tellurium, arsenic, antimony and bismuth, of which at least the major atom percent consists of arsenic, antimony, and/or bismuth.

Other useful compositions are represented by the formula $Mn_{2-x-y}T'_xT''_ySb_zIn_a$, where T' is chromium and/or vanadium, T'' is one or more of iron, cobalt, nickel and copper, $x$ is 0.003–0.25, $y$ is 0.003–0.25, $z$ is 0.50–1.00 and $a$ is 0–0.50. These compositions are more fully described in application Serial No. 261,784, now Patent No. 3,241,952, of W. W. Gilbert and T. J. Swoboda, filed February 28, 1963.

Processes for preparing compositions useful as temperature responsive component of this invention are described in the foregoing applications and in application Serial No. 120,679, now Patent No. 3,196,055, of W. W. Gilbert, filed June 29, 1961.

The components of the device of the present invention are each capable of being produced in compact form; thus allowing the production of a thermostat of the present invention in compact, or miniature, form.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

We claim:

1. A device for controlling the temperature of an environment by controlling the current to a heat transfer plant at said environment which comprises, in combination, a support assembly; a movable member on said support assembly; indicator means on said movable member for selecting a desired temperature of an environment; a series of adjacent temperature responsive magnetic elements mounted upon said movable member, said elements each exhibiting a reversible change in saturation induction at a different discrete transition temperature level, said elements arranged and positioned in a sequential order of graduated transition temperature levels corresponding to said indicator means for selecting a desired temperature of an environment; resilient means movably mounted on said support assembly to and from a rest position; magnetic means mounted on said resilient means, said magnetic means positioned to be attracted to a selected temperature responsive magnetic element when said element is in a magnetic state thereby forcing said resilient means from rest position; and switch means for actuating said heat transfer plant, said switch means located on said support assembly and positioned to operatively engage said resilient means for actuation and deactuation upon movement of said resilient means to and from rest position.

2. A device of claim 1 wherein said magnetic means comprises a permanent magnet; wherein said resilient means comprises a spring biased lever arm provided with an insulated plate; wherein said switch means comprises a spring loaded lever arm attached to said support assembly and positioned to allow contact with said insulated plate as said plate moves thereby forcing said spring loaded lever arm from rest position, and a first and a second electrical contact located on said spring loaded lever arm and said support respectively, said first and second contact positioned for abutment when said spring loaded lever arm is in rest position; and wherein said heat transfer plant is a heating unit.

3. A device of claim 2 wherein said insulated plate comprises a projection located intermediate the magnet and the base of the spring biased lever arm.

4. A device of claim 1 wherein said temperature responsive magnetic elements are positioned such that adjacent edges of any two of said elements are in close proximity for substantially the entire edge length, and wherein the transition temperature range for each element is approximately twice the temperature interval between transition range midpoints of each element.

5. A device of claim 1 wherein each temperature responsive magnetic element contains at least two transition elements selected from Groups V–B, VI–B and VII–B of the Periodic Table, of which at least one is taken from the first row of said transition elements, and at least one element of Group V–A selected from the class consisting of As, Sb and Bi.

6. A device of claim 1 wherein said magnetic means comprises a permanent magnet; wherein said resilient means comprises a spring biased lever arm; wherein said switch means comprises a first electrical contact mounted on said spring biased lever arm, and a second electrical contact mounted upon said support assembly and positioned for abutment with said first contact when said spring biased lever arm is moved from said rest position; and wherein said heat transfer plant is a cooling unit.

7. A device for controlling the temperature of an environment by controlling the current to a heating plant at said environment which comprises, in combination; a support base; a shaft connected to said base; a circular disk axially mounted on said shaft for rotation, said disk spaced from said base; a series of closely adjacent temperature responsive elements mounted upon said disk on the side opposing said base, said elements each exhibiting a sharp and reversible change in saturation induction at a different discrete transition temperature level, said elements arranged and positioned in a sequential order of graduated transition temperature levels; a spring biased lever arm attached to said base on the side opposing said disk, movable to and from a rest position close to said base and a biased position away from said base; a permanent magnet mounted on said spring biased lever arm and positioned to respond to a selected temperature responsive magnetic element in the magnetic state; an insulated plate projecting from said spring biased lever arm; a spring loaded lever arm attached to said base on the side opposing said disk, movable to and from a rest position close to said base and a biased position away from said base, and positioned to contact said insulated plate; a first and a second electrical contact located on said spring loaded lever arm and said base, respectively, and positioned for abutment when said spring loaded lever arm is in rest position, said electrical contacts having terminals for connection to said heating plant; a stop member attached to said base and positioned to limit the movement of said spring biased lever arm by contact with said insulated plate; a transparent circular rotatable control member rigidly attached to said disk to provide means for rotation of said disk; a temperature dial affixed to said shaft and positioned intermediate said control member and said disk; a bimetallic thermometer attached to said shaft and positioned to register the temperature of the environment upon said dial; a pointer attached to said control member for registering the desired temperature of the environment, said pointer calibrated with the temperature responsive elements.

8. A device of claim 7 wherein each temperature responsive magnetic element is composed of chromium modified manganese antimonide.

References Cited by the Examiner
UNITED STATES PATENTS

| | | | |
|---|---|---|---|
| 2,855,484 | 10/1958 | Kreuter | 200—138 |
| 2,964,670 | 12/1960 | Bliss | 315—3.5 |
| 3,057,978 | 10/1962 | Huetten | 200—88 |
| 3,206,573 | 9/1965 | Anderson et al. | 200—88 |

BERNARD A. GILHEANY, *Primary Examiner.*

T. D. MACBLAIN, *Assistant Examiner.*